(12) United States Patent
Yamagishi et al.

(10) Patent No.: US 10,468,949 B2
(45) Date of Patent: Nov. 5, 2019

(54) ROTATING ELECTRICAL MACHINE

(71) Applicant: TOYOTA JIDOSHA KABUSHIKI KAISHA, Toyota-shi, Aichi-ken (JP)

(72) Inventors: Yoshitada Yamagishi, Okazaki (JP); Takashi Imakawa, Nisshin (JP); Toshiya Sugiyama, Okazaki (JP); Tetsuro Ichikawa, Suita (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 96 days.

(21) Appl. No.: 15/796,095

(22) Filed: Oct. 27, 2017

(65) Prior Publication Data

US 2018/0138787 A1   May 17, 2018

(30) Foreign Application Priority Data

Nov. 16, 2016   (JP) .................................. 2016-223089

(51) Int. Cl.
| | |
|---|---|
| *H02K 5/20* | (2006.01) |
| *H02K 9/19* | (2006.01) |
| *H02K 11/25* | (2016.01) |
| *H02K 9/193* | (2006.01) |

(52) U.S. Cl.
CPC .............. *H02K 11/25* (2016.01); *H02K 5/20* (2013.01); *H02K 9/19* (2013.01); *H02K 9/193* (2013.01)

(58) Field of Classification Search
CPC . H02K 11/25; H02K 5/20; H02K 9/19; H02K 9/193

USPC ............................................ 310/58, 68 C, 54
See application file for complete search history.

(56) References Cited

U.S. PATENT DOCUMENTS

| | | | | |
|---|---|---|---|---|
| 7,919,890 | B2 * | 4/2011 | Taketsuna | H02K 9/19 310/254.1 |
| 8,110,952 | B2 * | 2/2012 | Wakita | H02K 11/25 310/52 |
| 8,502,424 | B2 * | 8/2013 | Esse | H02K 9/19 310/52 |
| 8,558,422 | B2 * | 10/2013 | Baumann | H02K 9/197 310/52 |
| 8,803,378 | B2 * | 8/2014 | Sonohara | H02K 5/225 310/52 |
| 2010/0033040 | A1 | 2/2010 | Wakita | |

(Continued)

FOREIGN PATENT DOCUMENTS

| | | |
|---|---|---|
| JP | 2010-45892 A | 2/2010 |
| JP | 2013-31282 A | 2/2013 |
| JP | 5740311 B2 | 5/2015 |

*Primary Examiner* — John K Kim
(74) *Attorney, Agent, or Firm* — Sughrue Mion, PLLC

(57) ABSTRACT

A cooling structure for a rotating electrical machine includes a rotating electrical machine including a stator and the stator, a temperature sensor, and a first discharge mechanism. A plurality of discharge holes of the first discharge mechanism is disposed in a region excluding an avoidance region. The avoidance region is the same region as an arrangement region that is one of a right side region and a left side region with respect to a vertical line passing an axis of the stator as seen in the axial direction of the stator core, the one of the right side region and the left side region being a region in which the temperature sensor is arranged and the avoidance region is located above a lower end of the temperature sensor in the gravitation direction.

6 Claims, 12 Drawing Sheets

(56) References Cited

U.S. PATENT DOCUMENTS

| | | | |
|---|---|---|---|
| 2011/0148229 A1* | 6/2011 | Esse | H02K 9/19 |
| | | | 310/54 |
| 2013/0169073 A1 | 7/2013 | Nagahama et al. | |
| 2014/0125162 A1* | 5/2014 | Tsuchie | H02K 9/19 |
| | | | 310/54 |
| 2014/0126606 A1 | 5/2014 | Ito et al. | |
| 2014/0191696 A1* | 7/2014 | Hattori | H02K 9/19 |
| | | | 318/473 |
| 2014/0300222 A1* | 10/2014 | Kawai | H02K 9/26 |
| | | | 310/54 |
| 2015/0303860 A1* | 10/2015 | Imanishi | H02K 21/14 |
| | | | 318/473 |
| 2016/0013705 A1* | 1/2016 | Takei | H02K 9/19 |
| | | | 310/54 |
| 2018/0138787 A1* | 5/2018 | Yamagishi | H02K 11/25 |

* cited by examiner

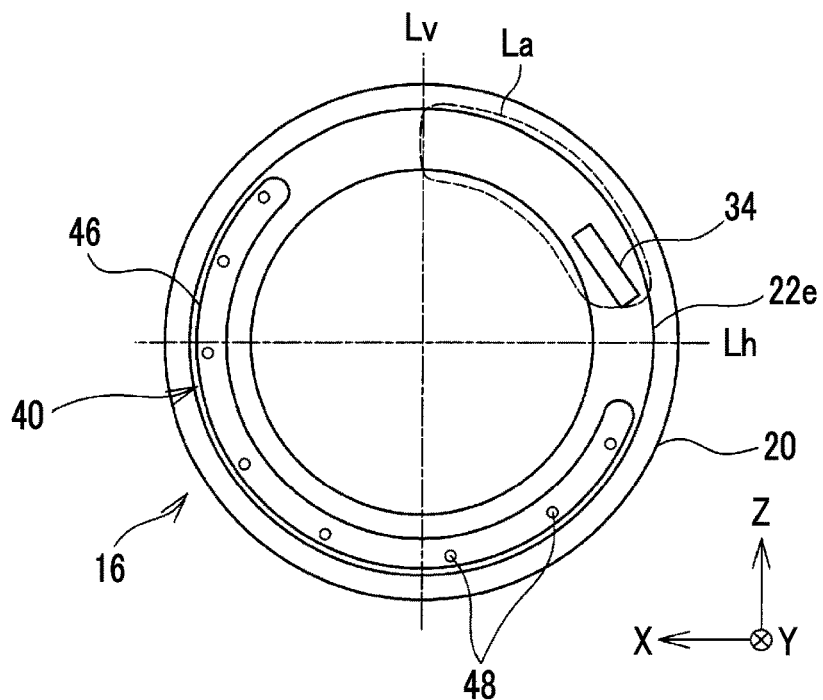
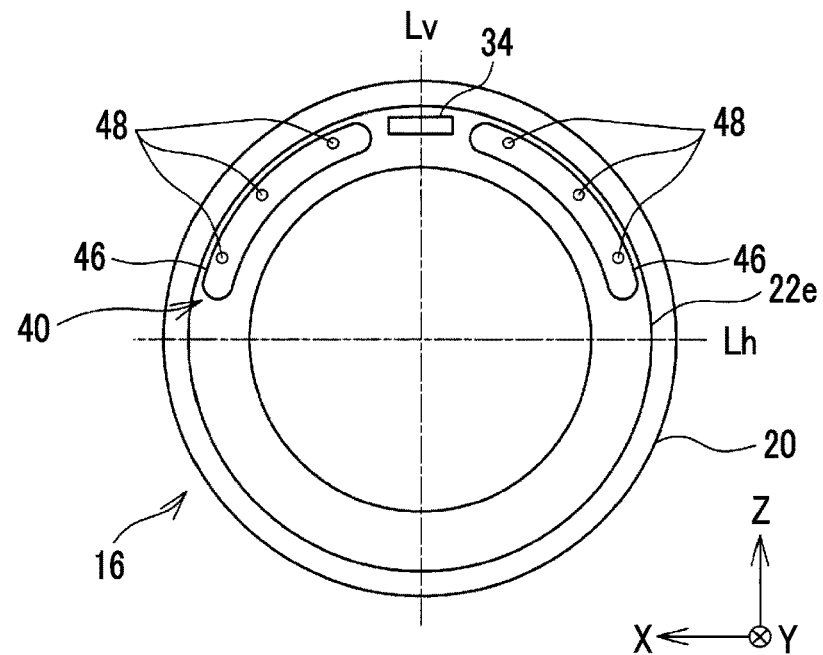

ROTATING ELECTRICAL MACHINE

INCORPORATION BY REFERENCE

The disclosure of Japanese Patent Application No. 2016-223089 filed on Nov. 16, 2016 including the specification, drawings and abstract is incorporated herein by reference in its entirety.

BACKGROUND

1. Technical Field

The present disclosure relates to a rotating electrical machine which is placed in a posture in which a rotating shaft intersects a gravitational direction and in which a temperature sensor is attached to a first-end-side coil end part that protrudes axially outwardly from an end surface of a stator core on a first axial end side. For example, the rotating electrical machine is mounted on a vehicle as an electric motor for driving the vehicle.

2. Description of Related Art

As is well known, in rotating electrical machines, losses, such as a copper loss, an iron loss, and a mechanical loss, occur with driving, and heat corresponding to the losses is generated. When the temperature of the rotating electrical machines becomes excessively high due to the heat generation, deterioration of components, demagnetization of permanent magnets, and the like are caused. Thus, in the related art, a technique of jetting a liquid serving as a refrigerant, for example, cooling oil toward a coil end part, which protrudes axially outward beyond a stator core, in a stator coil, and cooling the stator coil and furthermore a rotating electrical machine has been suggested.

For example, Japanese Patent No. 5740311 (JP 5740311 B) discloses a cooling structure in which a side cover that covers a side surface part (coil end part) of an electric motor (rotating electrical machine) is provided, and an oil passage through which lubricating oil flows, and a plurality of discharge holes that jets the lubricating oil toward an upper semicircular portion of a stator are formed in the side cover. According to this technique, after the lubricating oil is applied to the upper semicircular portion of the stator, the lubricating oil also flows to a lower semicircular portion of the stator under the influence of gravity. Therefore, the entire stator can be effectively cooled.

SUMMARY

Meanwhile, among rotating electrical machines, there is a rotating electrical machine to which a temperature sensor is attached in order to detect the temperature of the stator coil. In this case, various control parameters are changed in accordance with a temperature detected by the temperature sensor. For example, in order to protect the rotating electrical machine from heat, in a case where the detected temperature of the stator coil is excessively high, an electric current flowing to the stator coil may be limited, and the copper loss may be reduced. Additionally, the discharge flow rate of the refrigerant liquid may be adjusted in accordance with the detected temperature of the stator coil. In this way, the rotating electrical machine can be more reliably protected from heat by controlling the amount of energization or the discharge flow rate of the refrigerant in accordance with the temperature of the stator coil.

However, generally, the temperature sensor is often provided at the coil end part. For that reason, as in JP 5740311 B or the like, the refrigerant may be applied to the temperature sensor when the refrigerant is discharged to a coil end part. When the refrigerant is applied to the temperature sensor, the deviation between an actual temperature of the stator coil and the temperature detected by a temperature sensor becomes large. As a result, the amount of energization or the discharge flow rate of the refrigerant cannot be appropriately controlled.

The disclosure provides a rotating electrical machine which can appropriately cool a stator while maintaining the detection accuracy of the temperature of a stator coil.

A first aspect relates to a rotating electrical machine including a rotating shaft intersecting a gravitational direction, a stator having a stator core and a first-end-side coil end part that protrudes axially outwardly from a first end surface of the stator core on a first axial end side of the stator core, a rotor, a case which accommodates the stator and the rotor. The rotating electrical machine further includes a temperature sensor that is attached to a first-end-side coil end part that protrudes axially outwardly from an end surface of the stator core on a first axial end side; and a first discharge mechanism having a plurality of discharge holes, through which a refrigerant is discharged toward the first-end-side coil end part, on a surface of the sheathing case that faces the first-end-side coil end part in an axial direction of the stator core. The discharge holes of the first discharge mechanism are disposed in a region excluding an avoidance region. The avoidance region is the same region as an arrangement region that is one of a right side region and a left side region with respect to a vertical line passing an axis of the stator as seen in an axial direction of the stator, the one of the right side region and the left side region being a region in which the temperature sensor is arranged and the avoidance region is located above a lower end of the temperature sensor in a gravitation direction.

According to the aspect, the refrigerant is prevented from being applied to the temperature sensor by disposing the discharge holes of the first discharge mechanism so as to avoid the avoidance region. As a result, the stator can be appropriately cooled while maintaining the detection accuracy of the temperature of the stator coil.

In the cooling structure according to the aspect, the temperature sensor may be attached to a region of the first-end-side end part above a horizontal line passing the axis of the stator as seen in the axial direction of the stator.

According to the aspect, by attaching the temperature sensor to a region of the first-end-side end part above the horizontal line in the gravitational direction, the avoidance region becomes small and a range where the discharge holes of the first discharge mechanism can be disposed becomes wide. Additionally, by adopting this arrangement, the temperature sensor is not easily immersed in the refrigerant collected at the bottom of the case. Therefore, the detection accuracy of the temperature of the stator coil can be further enhanced.

In the cooling structure according to the aspect, the discharge holes of the first discharge mechanism may be disposed above the horizontal line in the gravitational direction.

According to the aspect, in a case where this arrangement is adopted, the refrigerant discharged from the discharge holes also spreads downward due to gravity. As a result, even when the number of discharge holes is small, the refrigerant can be applied over a wide range.

In the cooling structure according to the aspect, the cooling structure may further include a second discharge mechanism having a plurality of discharge holes, through which a refrigerant is discharged toward a second-end-side coil end part, on a surface of the case that faces the second-end-side coil end part, which protrudes axially outwardly from an end surface of the stator core on a second axial end side, in the axial direction. The discharge holes of the second discharge mechanism may be disposed in regions on both right and left sides with respect to the vertical line.

According to the aspect, the stator coil can be more effectively cooled by providing the discharge mechanism also on a second end side where the temperature sensor is not provided.

In the cooling structure according to the aspect, the amount of refrigerant discharged per unit time from the second discharge mechanism may be larger than the amount of refrigerant discharged per unit time from the first discharge mechanism.

According to the aspect, the entire stator can be more effectively cooled by increasing the discharge flow rate of the second discharge mechanism that does not need to avoid the temperature sensor.

In the cooling structure according to the aspect, the case may include a case body, a cover that covers a first end of the case body, and a first discharge plate. A first cooling groove that extends in the circumferential direction may be provided at a position, which faces the coil end part in the axial direction, on an inner surface of one member of the case body and the cover. The first discharge plate may have the discharge holes of the first discharge mechanism and may be attached to the inner surface of the one member of the case body and the cover so as to cover the first cooling groove.

According to the aspect, in a case where this configuration is adopted, the cooling groove is a refrigerant path through which the refrigerant flows. By constituting the refrigerant path and the discharge holes of two members including one member of the case body and the cover and the discharge plate, machining for forming the discharge holes and the refrigerant path that communicates with the discharge holes becomes easy.

According to the aspect, since the discharge holes of the first discharge mechanism are disposed so as to avoid the avoidance region, the refrigerant is prevented from being applied to the temperature sensor. As a result, the stator can be appropriately cooled while maintaining the detection accuracy of the temperature of the stator coil.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 12 is a view illustrating an example of another discharge mechanism;

FIG. 13 is a view illustrating an example of still another discharge mechanism;

DETAILED DESCRIPTION OF EMBODIMENTS

Figure 1:
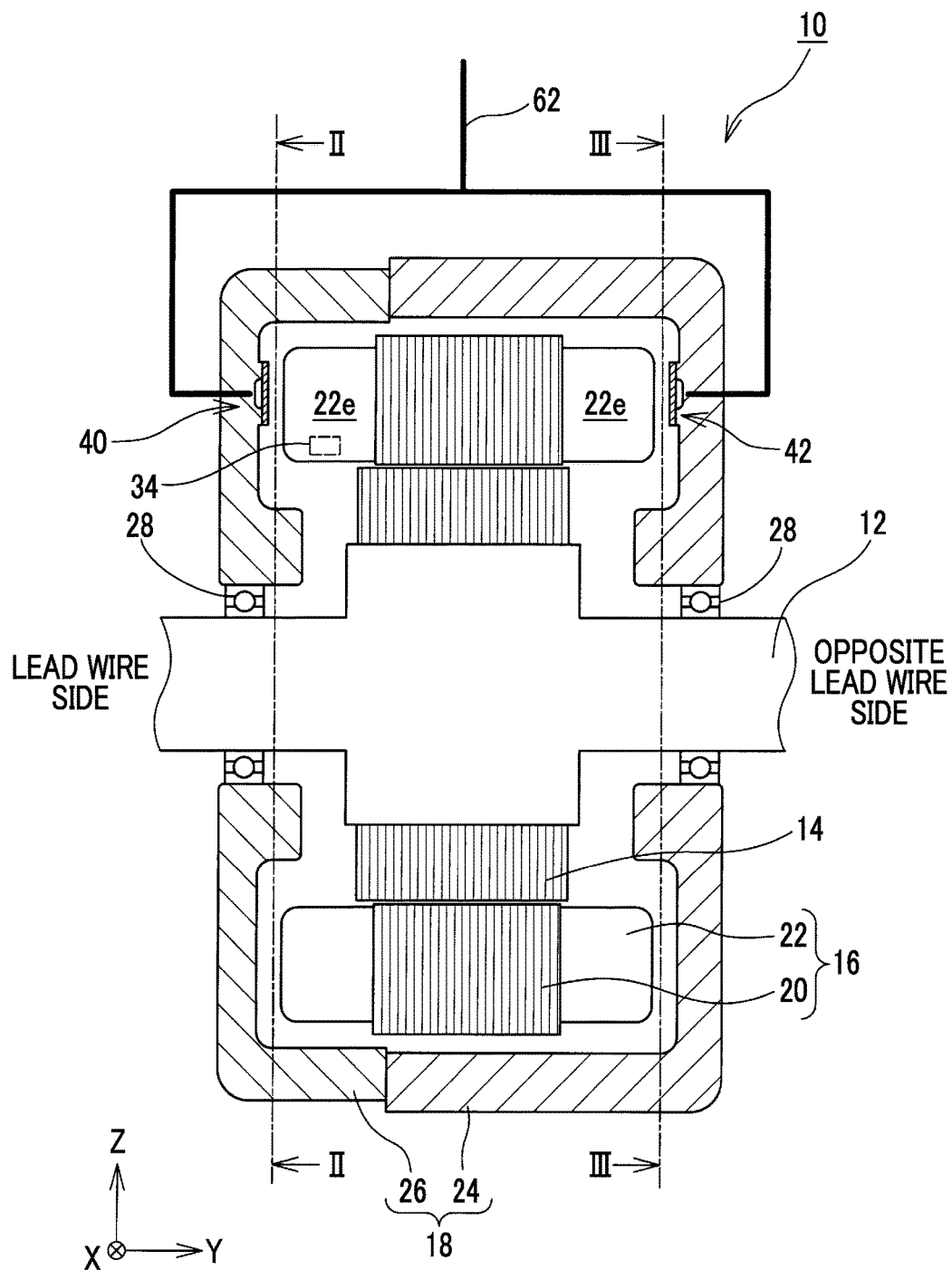
FIG. 1 is a schematic longitudinal sectional view of a rotating electrical machine that is an embodiment.
Figure 2:
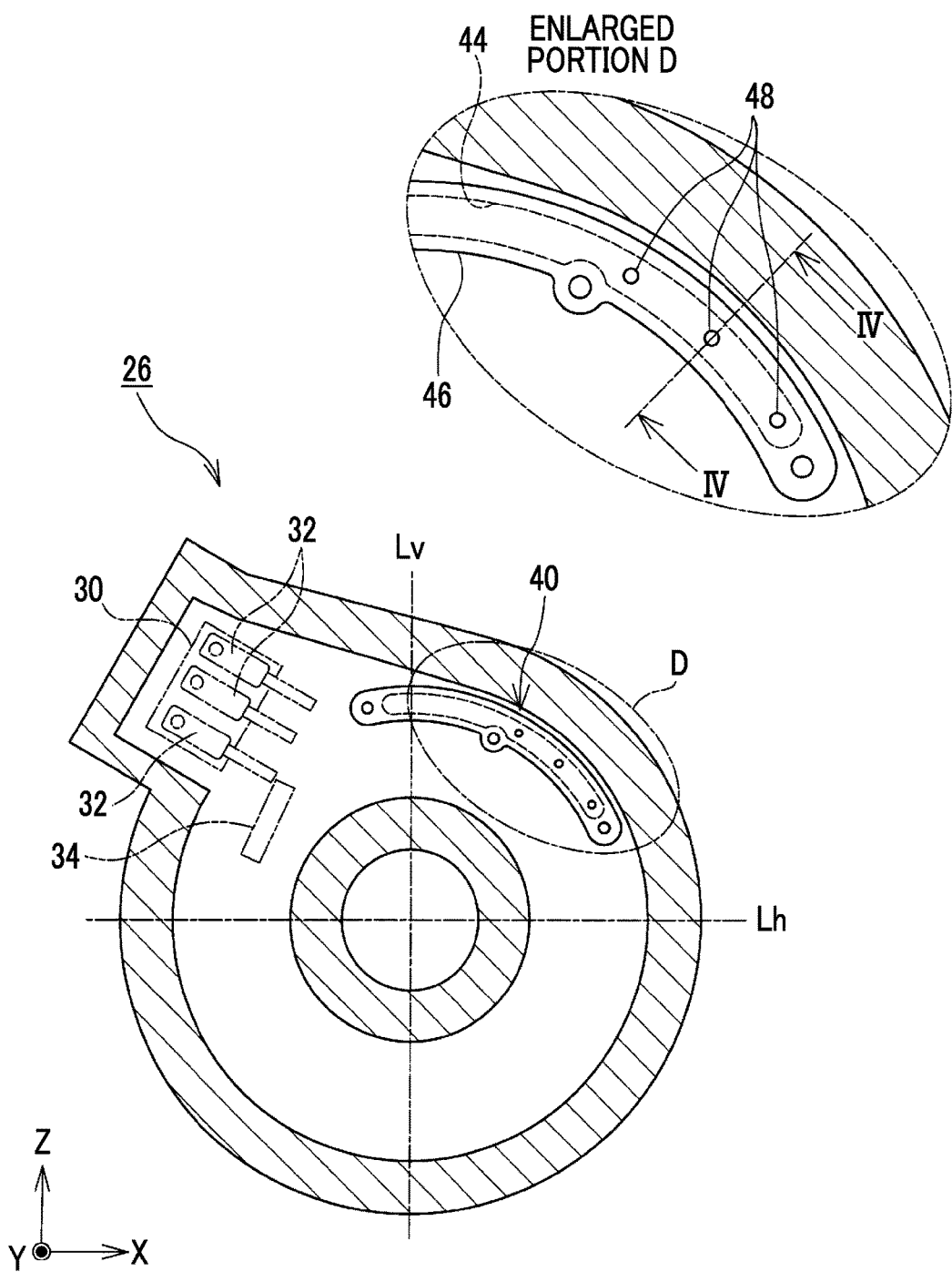
FIG. 2 is a sectional view taken along line II-II of FIG. 1.
Figure 3:
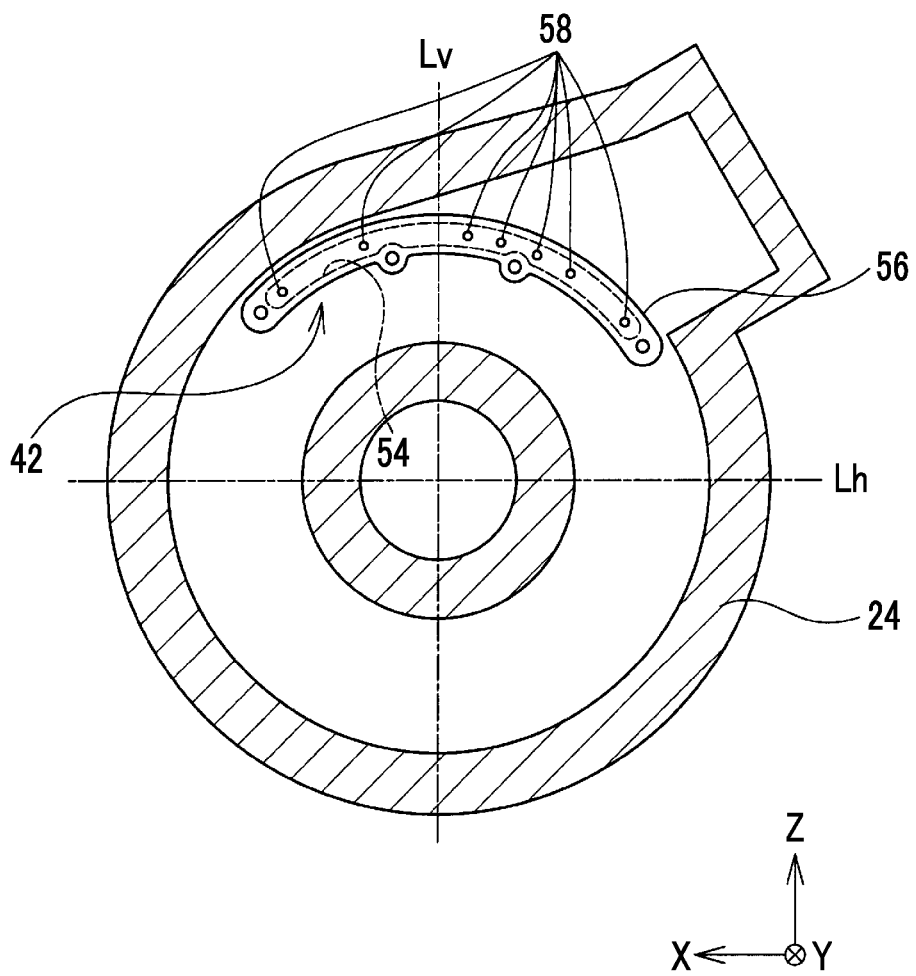
FIG. 3 is a sectional view taken along line III-III of FIG. 1.
Figure 4:
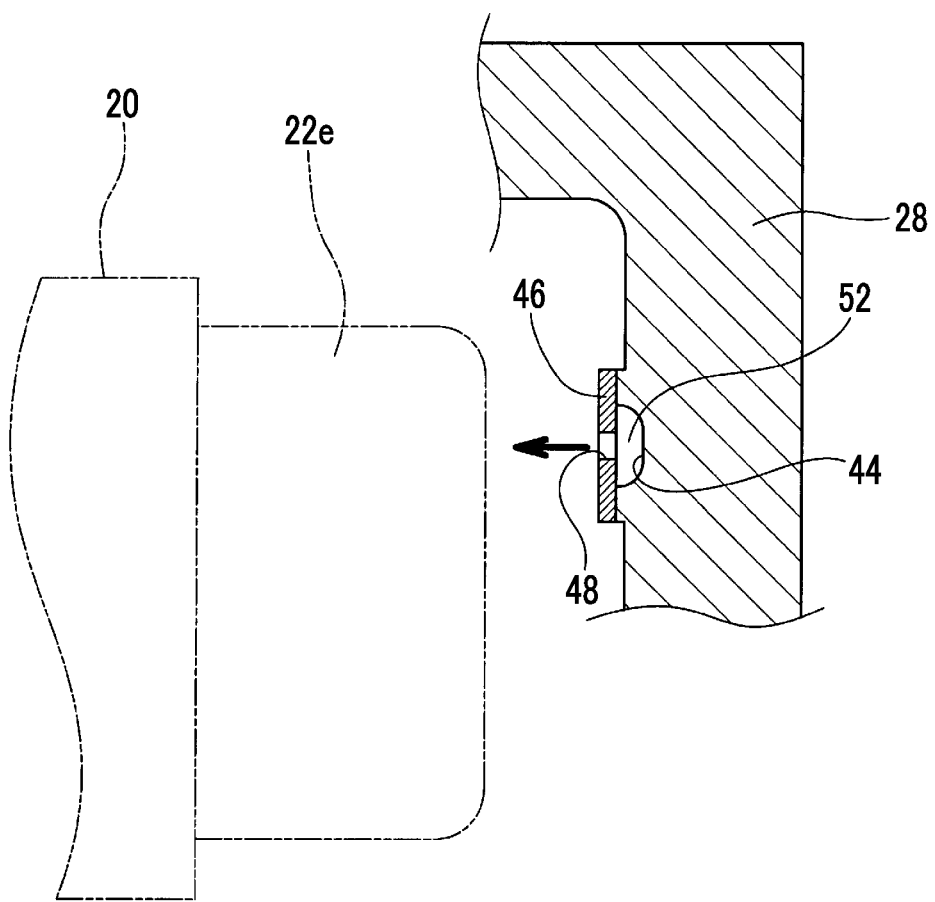
FIG. 4 is a sectional view taken along line IV-IV of FIG. 2.

Hereinafter, a rotating electrical machine 10 that is an embodiment will be described with reference to the drawings. FIG. 1 is a schematic longitudinal sectional view of the rotating electrical machine 10 that is an embodiment. Additionally, FIG. 2 is a sectional view taken along line II-II of FIG. 1, and FIG. 3 is a sectional view taken along line III-III of FIG. 1. Additionally, FIG. 4 is a sectional view taken along line IV-IV of FIG. 2. In addition, in FIGS. 1 to 3, gravity acts downwardly from the top of the paper, a Z-axis direction is the gravitational direction, an X-axis direction and a Y-axis direction are a horizontal direction.

The rotating electrical machine 10 is mounted on an electrically powered vehicle, for example, a hybrid vehicle or an electric vehicle. In the electrically powered vehicle, the rotating electrical machine 10 may be used as a drive motor that generates the power for driving the vehicle, or may be used as a generator that generates electric power with a regenerative braking force or engine surplus power. In the electrically powered vehicle, the rotating electrical machine 10 is placed in a posture in which a rotating shaft 12 thereof is substantially orthogonal to the gravitational direction. However, the rotating electrical machine 10 may be placed so as to be inclined with respect to the horizontal direction as long as the rotating shaft 12 intersects the gravitational direction.

The rotating electrical machine 10 includes the rotating shaft 12, a rotor 14 anchored to the rotating shaft 12, a stator 16 disposed around an outer periphery of the rotor 14, and a sheathing case 18 that accommodates the constituent elements. The rotating shaft 12 is axially supported by the sheathing case 18 via a bearing 28, and is rotatable. The rotor 14 is a substantially annular member including a rotor core composed of laminated steel sheets, and a plurality of permanent magnets embedded within the rotor core. The rotor 14 is anchored to the rotating shaft 12, and the rotating shaft 12 rotates integrally with the rotor 14.

The stator 16 includes a stator core 20 and a stator coil 22. The stator core 20 is a substantially annular member composed of laminated steel sheets, and includes an annular yoke and a plurality of teeth that protrudes radially inwardly from an inner periphery of the yoke. A winding wire that constitutes the stator coil 22 is wound around each tooth. A method of winding the winding wire may be concentrated winding in which a winding wire is wound to one tooth or may be distributed winding in which a winding wire is wound over a plurality of teeth. In any case, coil end parts 22e, which are portions that protrude axially outwardly from an axial end surface of the stator core 20 in the stator coil 22, are present at both axial ends of the stator 16.

The stator coil 22 is configured by wire-connecting three-phase coils, that is, a U-phase coil, a V-phase coil, and a W-phase coil. The wire-connection aspect of the coils is not particularly limited. In the present embodiment, however, star wire-connection is adopted in which terminals of the respective three-phase coils are collectively connected at a neutral point. In a case where the rotating electrical machine 10 is used as an electric motor, three-phase alternating current is applied to the stator coil 22. Accordingly, a rotating magnetic field is formed and the rotor 14 rotates. Additionally, in a case where the rotating electrical machine 10 is used as the generator, the rotating shaft 12 and the rotor 14 are rotated with the regenerative braking force of the vehicle or the engine surplus power. Accordingly, an electric current is induced in the stator coil 22.

Starting ends of the respective three-phase coils are connected to input/output terminals 32 provided on a terminal block 30 (not illustrated in FIG. 1, refer to FIG. 2). The terminal block 30 is a member attached to a first axial end of the stator 16, and has the input/output terminals 32. The input/output terminals 32 electrically relay the respective three-phase coils to an inverter provided outside. In addition, in the following, a side (a left side in FIG. 1) where the terminal block 30 and a temperature sensor 34 to be described below are provided, out of both axial sides of the rotating electrical machine 10 is referred to as a "lead wire side", and its opposite side (a right side in FIG. 1) is referred to as an "opposite lead wire side". The "lead wire side" in the present embodiment corresponds to a "first end side" in the claims, and the "opposite lead wire side" corresponds to a "second end side" in the claims.

A coil end part 22e on the lead wire side is provided with the temperature sensor 34 for detecting the temperature of the stator coil 22. The temperature sensor 34 is not particularly limited as long as an electrical signal corresponding to temperature can be output. For example, the temperature sensor 34 is a thermistor or the like. A control unit (not illustrated) that controls the driving of the rotating electrical machine 10 limits an electric current that flows to the stator coil 22 in a case where the detected temperature of the temperature sensor 34 is high, in order to protect the rotating electrical machine 10 from heat. Additionally, the control unit adjusts the discharge flow rate of cooling oil (refrigerant) to be discharged to the stator coil 22 in accordance with the detected temperature of the temperature sensor 34.

Here, as illustrated in FIG. 2, as seen in the axial direction of the stator, a line that equally divides the stator 16 into right and left portions, is referred to as a vertical line Lv (a left-and-right dividing line), and a line that equally divides the stator 16 into upper and lower portions is referred to as a horizontal line Lh (an upper-and-lower dividing line). The vertical line Lv and horizontal line Lh pass the axis of the stator. Then, the terminal block 30 and the temperature sensor 34 are provided at positions that are inclined by about 20 degrees to 60 degrees with respect to the vertical line Lv. In other words, the terminal block 30 and the temperature sensor 34 are provided at positions shifted from the vertical line above the horizontal line of the stator 16.

The sheathing case 18 is roughly divided into a case body 24, a cover 26, and two discharge plates 46, 56 attached to inner surfaces of the case body 24 and the cover 26. The case body 24 is a substantially cylindrical member of which a first axial end (a lead-wire-side end part in the present embodiment) opens. Additionally, the cover 26 is a member that covers the opening of the case body 24, and is fixed to the case body 24 by fixing means, such as a bolt. Since a well-known related art can be used as a basic configuration of the sheathing case 18, the detailed description of the basis configuration herein will be omitted. In the following, a first discharge mechanism 40 and a second discharge mechanism 42 that are provided at the sheathing case 18 will mainly be described.

A surface of the cover 26, which faces the coil end part 22e on the lead wire side, is provided with the first discharge mechanism 40 that discharges the cooling oil. Additionally, a surface of the case body 24, which faces the coil end part 22e on a second end side (a right end side of FIG. 1), is provided with the second discharge mechanism 42 that discharges the cooling oil.

As illustrated in FIGS. 2 and 4, the first discharge mechanism 40 is constituted of a first cooling groove 44 formed on an inner surface of the cover 26, and a first discharge plate 46 that covers the first cooling groove 44. The first cooling groove 44 is a groove, which extends in a circumferential direction at a position that faces the coil end part 22e in an axial direction, in the cover 26.

Additionally, the first discharge plate 46 is a circular-arc plate that is sufficiently broader than the first cooling groove 44. The first discharge plate 46 is anchored to the inner surface of the cover 26 with a bolt or the like. In this case, the first discharge plate 46 is liquid-tightly in close contact with the inner surface of the cover 26, and covers the first cooling groove 44. Accordingly, a refrigerant path 52 through which the cooling oil flows is formed between the cover 26 and the first discharge plate 46.

A plurality of discharge holes 48 is formed in the first discharge plate 46 such that the discharge holes 48 are lined up at intervals in the circumferential direction. The respective discharge holes 48 pass through the first discharge plate 46 in a thickness direction. The cooling oil that flows through the refrigerant path 52 is jetted to the outside via the discharge holes 48. Hence, the cooling oil is jetted in the axial direction from the refrigerant path 52 via the discharge holes 48, and hits an axial end surface of the coil end part 22e on the lead wire side. The discharge holes 48 of the first discharge plate 46 are disposed at positions where no cooling oil is present in the temperature sensor 34. The above positions will be described below in detail.

The second discharge mechanism 42 also has almost the same structure as the first discharge mechanism 40. That is, as illustrated in FIG. 3, the second discharge mechanism 42 is constituted of a second cooling groove 54 that extends in the circumferential direction on the inner surface of the case body 24, and a second discharge plate 56 that covers the second cooling groove 54. In this case, the second discharge plate 56 is liquid-tightly in close contact with the inner surface of the case body 24, and covers the second cooling groove 54. A plurality of discharge holes 58 is formed in the second discharge plate 56 such that discharge holes 58 are lined up at intervals in the circumferential direction. The cooling oil is jetted in the axial direction from the refrigerant path 52 via the discharge holes 58, and hits an axial end surface of the coil end part 22e on the opposite lead wire side. The discharge holes 58 of the second discharge plate 56 are disposed at positions where no cooling oil is applied to the entire surface of the coil end part 22e. The above positions will be described below.

As illustrated in FIG. 1, a refrigerant passage 62, which guides the cooling oil to the first discharge mechanism 40 and the second discharge mechanism 42, is provided outside the sheathing case 18. The refrigerant passage 62 branches into two ways in the middle. The refrigerant passage 62 after the branching communicates with the first cooling groove 44 and the second cooling groove 54. Additionally, the cooling oil discharged to the coil end part 22e falls downward due to gravity and is accumulated at the bottom of the sheathing case 18. A recovery passage (not illustrated) for recovering the cooling oil to be stored is connected to the bottom of the sheathing case 18. The cooling oil recovered via the recovery passage is again supplied to the first and second discharge mechanisms 40, 42 via the refrigerant passage 62 after being self-cooled.

Figure 5:
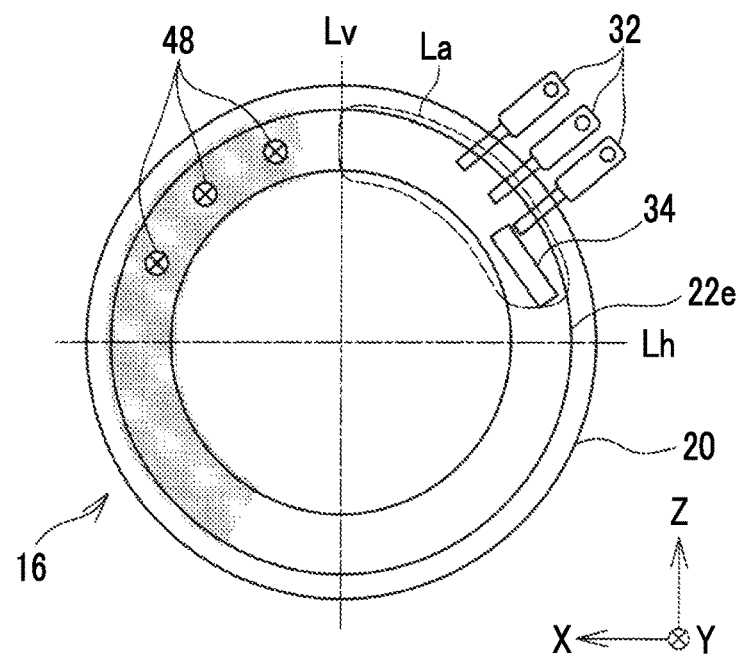
FIG. 5 is a view illustrating a positional relationship between a plurality of discharge holes of a first discharge mechanism, and a stator.
Figure 6:
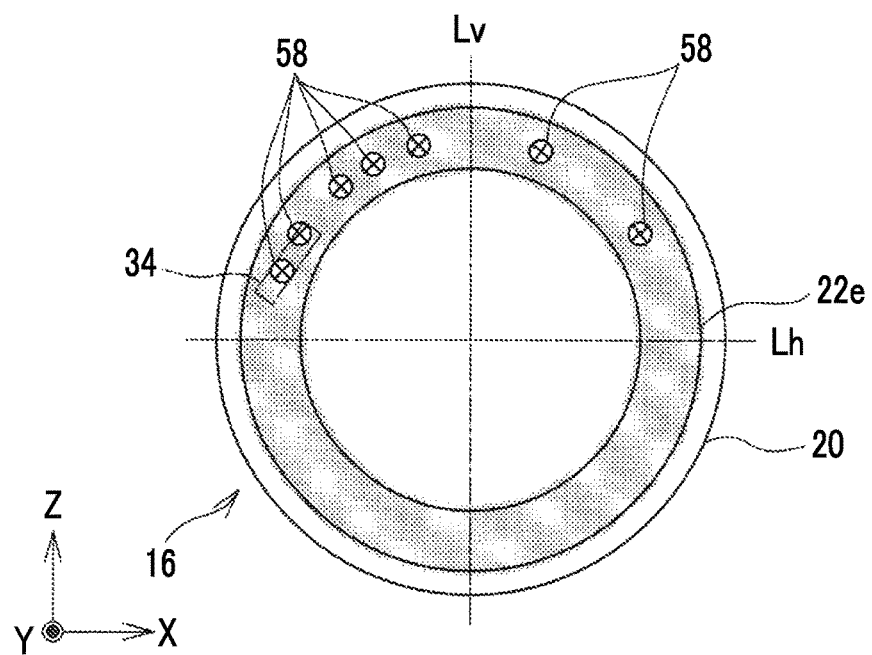
FIG. 6 is a view illustrating a positional relationship between a plurality of discharge holes of a second discharge mechanism, and the stator.

Next, the arrangement of the discharge holes 48, 58 in the first and second discharge mechanisms 40, 42 will be described with reference to FIGS. 5 and 6. FIG. 5 is a view illustrating a positional relationship between the discharge holes 48 of the first discharge mechanism 40, and the stator 16. FIG. 6 is a view illustrating a positional relationship between the discharge holes 58 of the second discharge mechanism 42, and the stator 16. In addition, FIG. 5 is a view of the coil end part 22e on the lead wire side as seen from the left side of the paper of FIG. 1. In addition, FIG. 6 is a view of the coil end part 22e on the opposite lead wire side as seen from the left side of the paper of FIG. 1. Hence, in FIGS. 2 and 5 and FIGS. 3 and 6, directions of sight lines are reversed. Since the directions of sight lines are reversed, the positions of the discharge holes 48, 58, the temperature sensor 34, and the like are seen to be reversed rightward and leftward in FIG. 2 and FIG. 5 and FIGS. 3 and 6.

As mentioned earlier, the temperature sensor 34 and the terminal block 30 are attached to the coil end part 22e on the lead wire side. The temperature sensor 34 and the terminal block 30 are disposed at positions shifted from the vertical line Lv above the horizontal line Lh. By disposing the temperature sensor 34 above the horizontal line Lh in this way, the temperature sensor 34 is not easily immersed in the cooling oil accumulated at the bottom of the sheathing case 18. Additionally, by disposing the temperature sensor 34 above the horizontal line Lh, an avoidance region to be described below can be narrowed, and a region where the discharge holes 48 can be disposed becomes wide.

The discharge holes 48 of the first discharge mechanism 40 are disposed at positions where no cooling oil is present in the temperature sensor 34. Specifically, the discharge holes 48 are disposed in a region where the avoidance region La is avoided. In FIG. 5, the avoidance region La is a region enclosed by a dashed line, and is a region on or above an upper end of the temperature sensor 34 in the axial direction.

In the present embodiment, the discharge holes 48 of the first discharge mechanism 40 are provided in a region above the horizontal line Lh on the opposite side of the vertical line Lv from the temperature sensor 34. The cooling oil discharged from the discharge holes 48 falls downward along the coil end part 22e due to the influence of gravity after hitting the axial end surface of the coil end part 22e. In FIG. 5, thin ink hatching indicates a range where the cooling oil is applied.

As is clear from FIG. 5, when the discharge holes 48 are disposed above the horizontal line Lh, the discharged cooling oil spreads downward due to gravity. Therefore, the cooling oil can be applied over a wide range even when the number of discharge holes 48 is small. Additionally, since the discharge holes 48 are not provided on the same side as the temperature sensor 34 as seen from the vertical line Lv, the cooling oil is not applied to the temperature sensor 34.

Also in FIG. 6, thin ink hatching indicates a range where the cooling oil is applied. Additionally, the temperature sensor 34 is not provided on the opposite lead wire side illustrated in FIG. 6. However, in FIG. 6, the position of the temperature sensor 34 disposed on the lead wire side is illustrated by a two-dot chain line for reference.

The discharge holes 58 of the second discharge mechanism 42 are disposed in regions on both right and left sides with respect to the vertical line Lv. In the present embodiment, five discharge holes 58 are provided in the same region as the temperature sensor 34 with the vertical line Lv as a center, and two discharge holes 58 are provided in a region on the opposite side of the vertical line from the temperature sensor 34. In other words, seven discharge holes 58 are provided at the second discharge mechanism 42 and are more than the discharge holes 48 of the first discharge mechanism 40. As the number of discharge holes is larger, the flow rate of a refrigerant discharged per unit time from the second discharge mechanism 42 is also more than the refrigerant flow rate of the first discharge mechanism 40. Additionally all the discharge holes 58 are disposed above the horizontal line Lh.

The cooling oil jetted from the discharge holes 58 falls downward along the coil end part 22e under the influence of gravity after hitting the axial end surface of the coil end part 22e on the opposite lead wire side. Additionally, since the discharge holes 58 are provided on both right and left sides, the cooling oil is applied to the entire coil end part 22e. Additionally, in the present embodiment, on the opposite lead wire side, the discharge holes 58 disposed on the left side are provided more than the discharge holes 58 disposed on the right side. The discharge holes 58 are provided as mentioned above because the left side on the opposite lead wire side is the right side on the lead wire side and is a side where the temperature sensor 34 is disposed. On the lead wire side, in a region where the temperature sensor 34 is disposed, the cooling oil is not applied, and cooling capacity tends to become low. Thus, on the opposite lead wire side, in order to increase the discharge flow rate of the cooling oil and to enhance the cooling capacity, the number of discharge holes 58 is increased.

Figure 7:
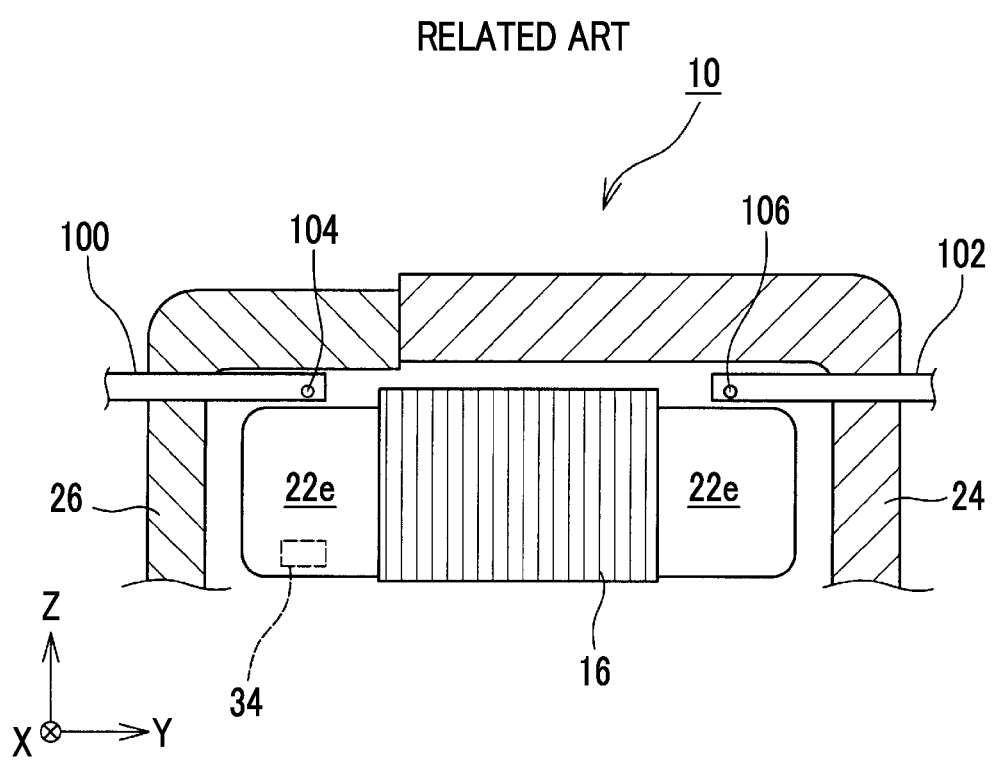
FIG. 7 is a view illustrating an example of a discharge mechanism of the related art.
Figure 8:
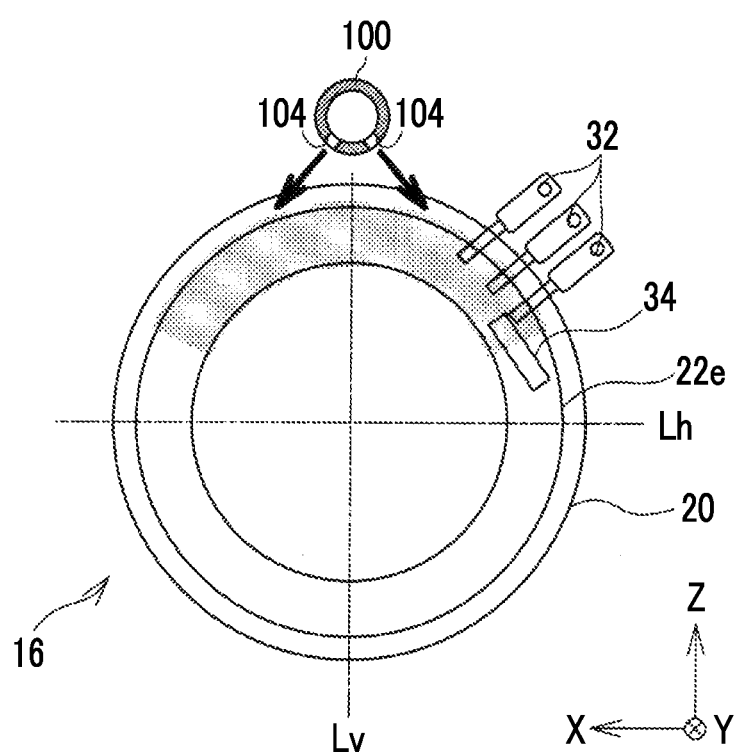
FIG. 8 is a view illustrating a positional relationship between a plurality of discharge holes on a lead wire side and a stator in the related art.
Figure 9:
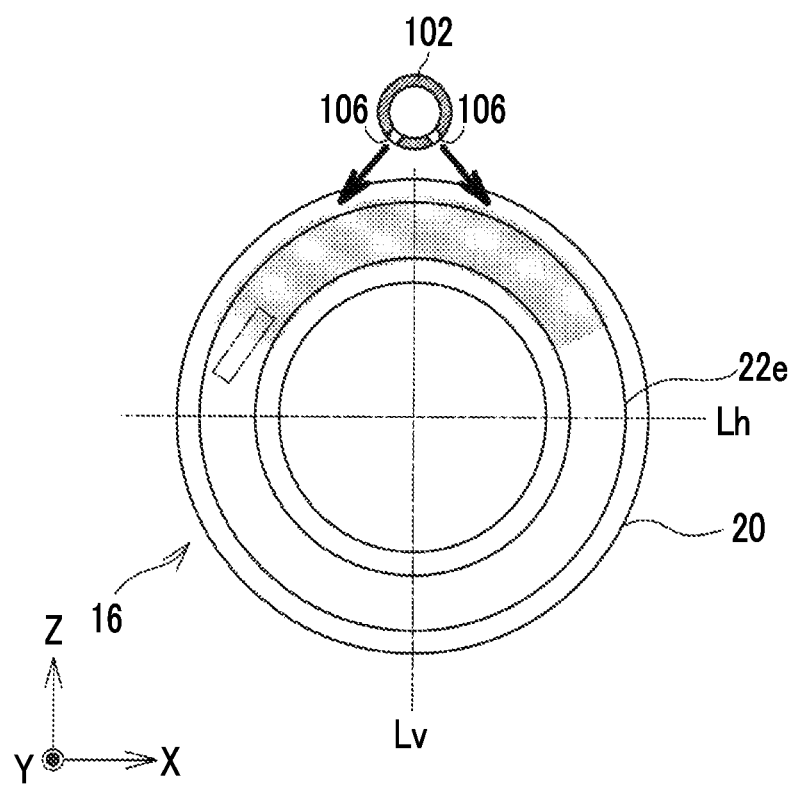
FIG. 9 is a view illustrating a positional relationship between a plurality of discharge holes on an opposite lead wire side and the stator in the related art.

Next, the reason why the discharge holes 48, 58 are disposed as described above will be described in comparison with the related art. FIG. 7 is a schematic view illustrating an example of the discharge mechanism of the related art. Additionally, FIG. 8 is a view illustrating a positional relationship between a plurality of discharge holes 104 on the lead wire side, and the stator 16. FIG. 9 is a view illustrating a positional relationship between a plurality of discharge holes 106 on the opposite lead wire side, and the stator 16.

In the related art, the first and second pipes 100, 102 that extend parallel to the rotating shaft 12 are provided upward in the gravitational direction from the coil end parts 22e. Each of the pipes 100, 102 is a pipe to which a starting end of each pipe is connected to a supply source of the cooling oil and a terminal of each pipe is blocked. Two discharge holes 104 and two discharge holes 106 are respectively formed on peripheral surfaces in the vicinity of the terminals of the pipes 100, 102. The cooling oil is released from the discharge holes 104, 106 to the outside. Hence, in the related art, the cooling oil is discharged in the radial direction via the discharge holes 104, 106 from the pipes 100, 102, and hits outer peripheral surfaces of the coil end parts 22e. Thereafter, the cooling oil that hits the outer peripheral surfaces of the coil end parts 22e falls downward along the coil end part 22e. However, although also depending on the discharge flow rate of cooling oil, the cooling oil does not easily reach a portion below the horizontal line Lh. Generally, the cooling oil is applied to an inclined range of about 40 degrees to 70 degrees from the vertical line Lv, as indicated by thin ink hatching in FIGS. 8 and 9.

Here, on the lead wire side, the temperature sensor 34 is provided in a position that is inclined by about 20 degrees to 70 degrees with respect to the vertical line Lv. Therefore, in the related art, the arrangement range of the temperature sensor 34 and the range where the cooling oil is applied overlap each other. Hence, in the related art, the cooling oil is readily applied to the temperature sensor 34. In this case, since the temperature of the temperature sensor 34 falls, the deviation between an actual temperature of the stator coil 22 and the temperature detected by the temperature sensor 34 is large.

Here, as already described, in order to protect the rotating electrical machine 10 from heat, the control unit of the rotating electrical machine 10 controls the amount of energization, the flow rate of the cooling oil, or the like based on the detected temperature of the temperature sensor 34. Hence, when the cooling oil is applied to the temperature sensor 34 and a temperature lower than an actual coil temperature is detected, the rotating electrical machine 10 cannot be appropriately protected from heat.

In order to avoid this problem, it is also considered that the temperature sensor 34 is disposed below the horizontal line Lh. According to this arrangement, even in the related art, the cooling oil discharged from the discharge holes 104 is not applied to the temperature sensor 34. However, the cooling oil that has fallen may be stored at a lower part of the sheathing case 18. When the temperature sensor 34 is provided at a lower part of the stator 16, the temperature sensor 34 may be flooded with the stored cooling oil. Even in this case, the detection accuracy of the temperature sensor 34 declines. That is, in order to maintain the accuracy of the detected temperature, it is desirable that the temperature sensor 34 is provided above the horizontal line in the gravitational direction.

Additionally, in the related art, the discharge holes 104 are provided above the stator 16. Therefore, the range where the cooling oil is applied is small, and the cooling efficiency of the stator coil 22 is bad. In the present embodiment, since the discharge holes 48, 58 are provided at intervals in the circumferential direction, the cooling oil can be applied over a wide range of the coil end part 22e. According to the embodiment, as a result, the stator 16 can be efficiently cooled.

Additionally, in the present embodiment, on the lead wire side, the cooling oil is applied on the opposite side from the temperature sensor 34 as seen from the vertical line Lv. Therefore, the deviation between the actual coil temperature and the detected temperature in the temperature sensor 34 can be suppressed to a small extent.

Figure 10:
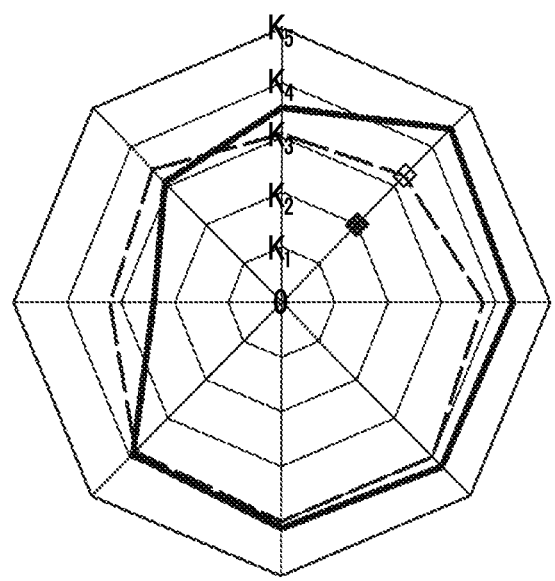
FIG. 10 is a view illustrating detected temperature in the present embodiment and detected temperature in the related art on the lead wire side.
Figure 11:
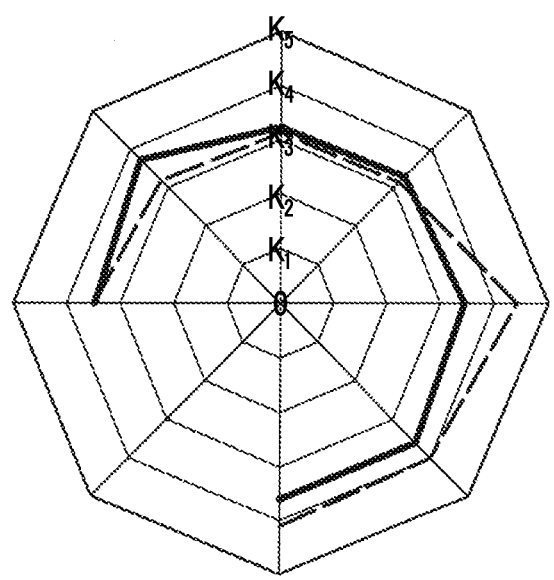
FIG. 11 is a view illustrating detected temperature in the present embodiment and the detected temperature in the related art on the opposite lead wire side.

FIGS. 10 and 11 illustrate experimental results obtained by measuring the temperature of the stator coil 22 in the present embodiment and the related art. In the experiments, the rotating electrical machine 10 of the present embodiment and the related art is driven, and the temperature of the stator coil 22 in that case is detected. The temperature sensor 34 that is a thermistor, and a thermocouple are used for the detection of the temperature of the stator coil 22. The temperature sensor 34 is provided at an inclined position of 45 degrees from the vertical line Lv in the coil end part 22e on the lead wire side. Eight thermocouples are provided at intervals of 45 degrees on the lead wire side, and seven thermocouples are provided at intervals of 45 degrees on the opposite lead wire side. Each thermocouple is provided inside the coil end part 22e such that the cooling oil is not applied thereof. Hence, it can be said that the detected temperature of the thermocouple is closer to the actual coil temperature than the detected temperature of the temperature sensor 34.

FIG. 10 illustrates temperature measurement results on the lead wire side, and FIG. 11 illustrates temperature measurement results on the opposite lead wire side. Additionally, in FIG. 10, black squares indicate the detected temperature of the temperature sensor 34 in the related art, and white squares indicate the detected temperature of the temperature sensor 34 in the present embodiment. Additionally, in FIGS. 10 and 11, a dashed line indicates the detected temperature of the thermocouples in the related art, and a solid line indicates the detected temperature of the thermocouples in the present embodiment. Additionally, graduation $K_n$ in the radial direction in FIGS. 10 and 11 indicate the temperature, and difference value $(K_{n+1}-K_n)$ between adjacent graduations is a constant fixed value irrespective of the value of n.

As is clear from FIG. 10 and FIG. 11, in the related art, the detected temperature (black squares) of the temperature sensor 34 is about $K_2$. Meanwhile, the detected temperature (dashed line) of the thermocouple becomes high in a lower half of the coil end part 22e, especially a lower half on the opposite lead wire side, and exceeds $K_4$. On the other hand, in the present embodiment, the detected temperature (white squares) of the temperature sensor 34 is about $K_3$. Additionally, the detected temperature (solid line) of the thermocouples becomes high in a right half on a lead wire side where the temperature sensor 34 is disposed, and exceeds $K_4$.

When the related art is compared to the present embodiment, the peak values of the detected temperatures of the thermocouples are almost the same as that in the related art and the present embodiment. However, the detected temperature of the temperature sensor 34 in the related art is lower than that in the present embodiment. That is, it can be seen that the deviation between the detected temperature of the thermocouples closer to the actual coil temperature and the detected temperature of the temperature sensor 34 is larger in the related art.

Here, the control unit of the rotating electrical machine 10 reduces the amount of energization or increases the flow rate of the cooling oil when the detected temperature of the temperature sensor 34 becomes high in order to protect the rotating electrical machine 10 from heat. When the deviation between the detected temperature of the temperature sensor 34 and the actual coil temperature becomes large, originally, there is a need for current limitation or an increase in the amount of the cooling oil. Irrespective of that, there is a possibility that the current limitation or the increase in the amount of the cooling oil may not be performed and the rotating electrical machine 10 may not be sufficiently protected from heat.

In the present embodiment, the discharge holes 48 on the lead wire side are disposed at the positions where the cooling oil is not applied to the temperature sensor 34. Therefore, the deviation between the detected temperature of the temperature sensor 34 and the actual coil temperature is smaller compared to the related art. As a result, the amount of energization of the stator coil 22 and the flow rate of the cooling oil can be appropriately controlled. On the other hand, in the present embodiment, the cooling on the lead wire side and the side where the temperature sensor 34 is disposed tends to be insufficient. Thus, in the present embodiment, the number of discharge holes 58 on the opposite lead wire side is increased in order to compensate for a decline in the cooling capacity on the lead wire side. Accordingly, the amount of the cooling oil discharged per unit time from the second discharge mechanism 42 is made larger than the amount of the cooling oil discharged per unit time from the first discharge mechanism 40. Accordingly, the cooling capacity on the opposite lead wire side can be enhanced, and an increase in temperature of the stator coil 22 can be further suppressed.

Moreover, in the present embodiment, the number (five) of discharge holes 58 to be disposed on the same region as the temperature sensor 34 as seen from the vertical line Lv on the opposite lead wire side is made larger than the number (two) of discharge holes 58 to be disposed on the opposite side from the temperature sensor 34. Accordingly, shortage of cooling on the lead wire side can be compensated for by the opposite lead wire side, and variation in the temperature of the stator coil 22 can be further reduced.

Additionally, in the present embodiment, the cooling oil is discharged from the discharge holes 48, 58 formed on the surfaces that face the coil end parts 22e in the axial direction. Hence, compared to the related art in which the cooling oil is discharged from the discharge holes 104, 106 on the upper sides of the coil end parts 22e in the gravitational direction, the cooling oil can be applied over a wide range, and the stator coil 22 can be more effectively cooled. Particularly, on the opposite lead wire side where the temperature sensor 34 is not provided, in the present embodiment, the cooling oil can be applied to the entire coil end part 22e. Therefore, the temperature of the coil end part 22e can be reduced as a whole compared to the related art.

Additionally, as is clear from the description up to now, in the present embodiment, all the discharge holes 48, 58 are provided above the horizontal line Lh in the gravitational direction. By adopting this configuration, the cooling oil can also be applied to a portion below the discharge holes 48, 58 using gravity. Hence, according to the present embodiment, the stator coil 22 can be effectively cooled as compared to a case where the discharge holes are provided below the horizontal line Lh.

Meanwhile, the configuration described up to now is merely an example. Other configurations may be used, as long as at least the discharge holes 48 provided on the lead wire side are disposed to avoid the avoidance region La (a region above the lower end of the temperature sensor 34 in the gravitational direction on the same side as the temperature sensor 34 as seen from the vertical line Lv).

For example, as illustrated in FIG. 12, the first discharge mechanism 40 disposed on the lead wire side may be formed in a substantial C-shape that is curved downward and outward, and some discharge holes 48 may be disposed at positions below the lower end of the temperature sensor 34 on the same side as the temperature sensor 34 as seen from the vertical line Lv.

Figure 14:
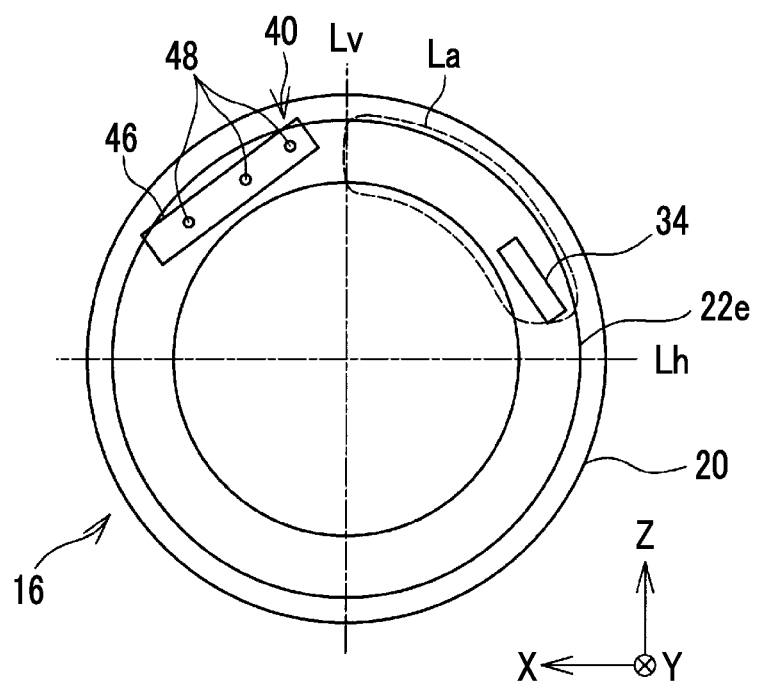
FIG. 14 is a view illustrating an example of still another discharge mechanism.

Additionally, the numbers of discharge mechanisms 40, 42 may be one or plural. Hence, as illustrated in FIG. 13, the first discharge mechanism 40 may be provided on both right and left sides with respect to the temperature sensor 34. Additionally, the position of the temperature sensor 34 may also be appropriately changed, and as illustrated in FIG. 13, the temperature sensor 34 may be disposed on the vertical line Lv, and first discharge mechanisms 40 may be disposed on both sides of the temperature sensor 34. Additionally, the shapes of the cooling grooves 44, 54 and the discharge plates 46, 56 are not particularly limited, and may be on a straight line as illustrated in FIG. 14.

Figure 15:
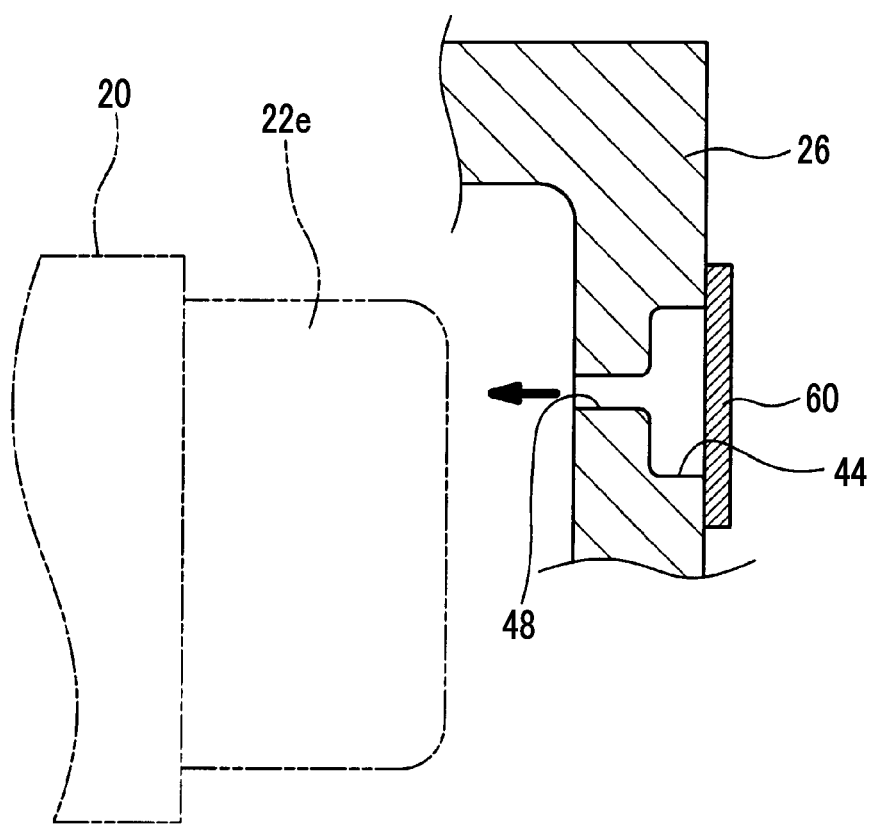
FIG. 15 is a view illustrating an example of still another discharge mechanism.

Additionally, in the description up to now, the discharge mechanisms 40, 42 are constituted of the case body 24 or the cover 26, and the discharge plates 46, 56. However, different configurations may be appropriately used as long as the discharge holes 48, 58 that discharge the cooling oil to the axial end surface of the coil end part 22e are obtained. For example, as illustrated in FIG. 15, the first discharge plate 46 may be abolished. Instead, the first cooling groove 44 may be provided on an outer surface of the cover 26, and the discharge holes 48 may be provided on an inner surface of the cover 26. In this case, a covering member 60 that covers the first cooling groove 44 may be attached to the outer surface of the cover 26.

What is claimed is:

1. A rotating electrical machine comprising:
   a rotating shaft intersecting a gravitational direction;
   a stator having a stator core and a first-end-side coil end part that protrudes axially outwardly from a first end surface of the stator core on a first axial end side of the stator core;
   a rotor;
   a case which accommodates the stator and the rotor;
   a temperature sensor that is attached to the first-end-side coil end part; and
   a first discharge mechanism having a plurality of first discharge holes on a first surface of the case facing the first-end-side coil end part, through which a refrigerant is discharged toward the first-end-side coil end part, wherein:
   the plurality of first discharge holes of the first discharge mechanism are disposed in a region excluding an avoidance region;
   the avoidance region is a region that is one of a right side region and a left side region with respect to a vertical line intersecting an axis of the stator in the gravitation direction of the stator core, the one of the right side region and the left side region being a region in which the temperature sensor is arranged and the avoidance region is located on and above an upper end of the temperature sensor in the axial direction; and
   the temperature sensor is attached to a region of the first-end-side end part above a horizontal line intersecting the axis of the stator in a horizontal direction of the stator.

2. The rotating electrical machine according to claim 1, wherein the plurality of first discharge holes of the first discharge mechanism are disposed above the horizontal line intersecting the axis of the stator in the axial direction of the stator.

3. The rotating electrical machine according to claim 1, wherein the plurality of discharge holes of the first discharge mechanism are disposed on the left side region of the vertical line corresponding to the gravitational direction.

4. The rotating electrical machine according to claim 1, further comprising a second discharge mechanism having a plurality of second discharge holes, through which a refrigerant is discharged toward a second-end-side coil end part of the stator core, the second discharge mechanism being provided on a second surface of the case that faces the second-end-side coil end part, which protrudes axially outwardly from a second end surface of the stator core on a second axial end side of the stator core, in the axial direction of the stator core, wherein the discharge holes of the second discharge mechanism are disposed in regions on both right and left sides of the vertical line.

5. The rotating electrical machine according to claim 4, wherein an amount of refrigerant discharged per unit time from the second discharge mechanism is larger than an amount of refrigerant discharged per unit time from the first discharge mechanism.

6. The rotating electrical machine according to claim 1, wherein:

the case includes a case body, a cover that covers a first end of the case body, and a discharge plate;

a first cooling groove is provided at a position of an inner surface of one member of the case body and the cover, the position of the inner surface faces the coil end part in the axial direction of the stator core, and the first cooling groove extends in a circumferential direction of the inner surface of the one member; and the discharge plate has the first discharge holes of the first discharge mechanism, and the discharge plate is attached to the inner surface of the one member of the case body and the cover so as to cover the first cooling groove.

* * * * *